United States Patent [19]
Elmore

[11] 3,942,616
[45] Mar. 9, 1976

[54] OVERRUNNING CLUTCH AND RETAINER
[75] Inventor: J. Russell Elmore, New Hartford, Conn.
[73] Assignee: The Torrington Company, Torrington, Conn.
[22] Filed: Apr. 5, 1974
[21] Appl. No.: 458,111

[52] U.S. Cl. .............................................. 192/45
[51] Int. Cl.² ...................... F16D 3/34; F16D 15/00
[58] Field of Search .................... 192/45; 188/82.84

[56] References Cited
UNITED STATES PATENTS

| 3,086,632 | 4/1963 | Wade et al. | 192/45 |
| 3,305,057 | 2/1967 | McAlpin et al. | 192/45 |
| 3,537,554 | 11/1970 | Elmore et al. | 192/45 |
| 3,537,555 | 11/1970 | Reister et al. | 192/45 |
| 3,760,914 | 9/1973 | Gelbrich | 192/45 |
| 3,820,640 | 6/1974 | Marola et al. | 192/45 |

Primary Examiner—Samuel Scott
Assistant Examiner—Lance W. Chandler
Attorney, Agent, or Firm—Frank S. Troidl

[57] ABSTRACT

This novel clutch retainer comprises two separated end plates. A plurality of circumferentially spaced spring tabs extend axially from each end plate toward the other end plate, the tabs biasing the clutching rollers toward locking engagement between the clutch cam surfaces and the shaft or inner race.

22 Claims, 24 Drawing Figures

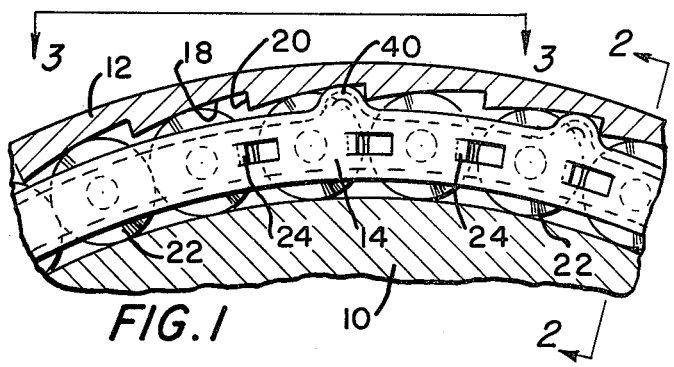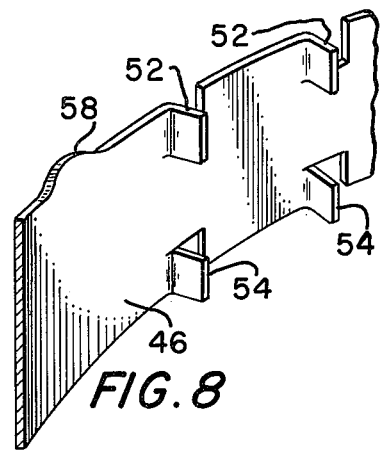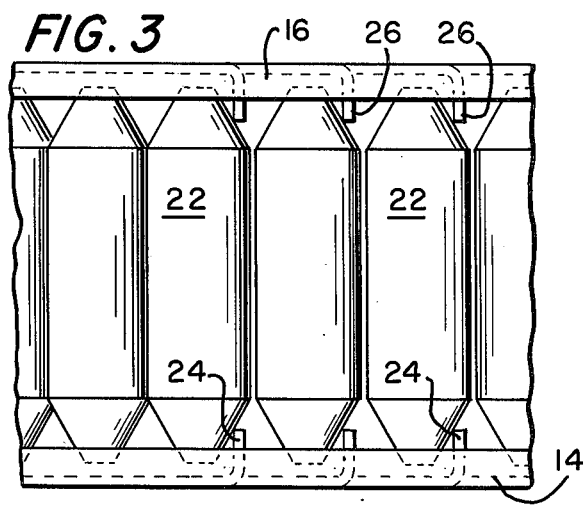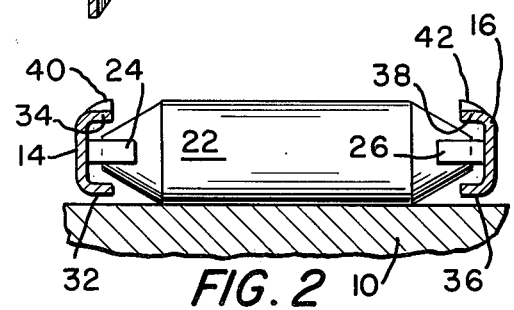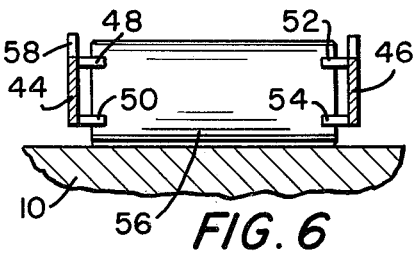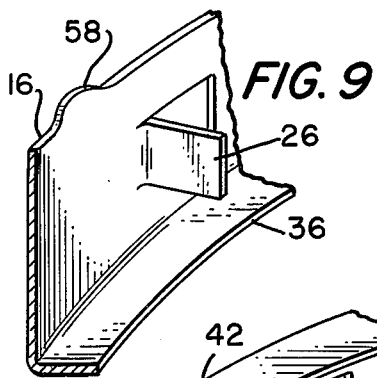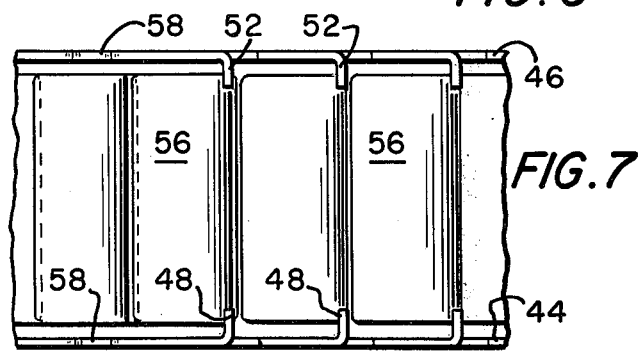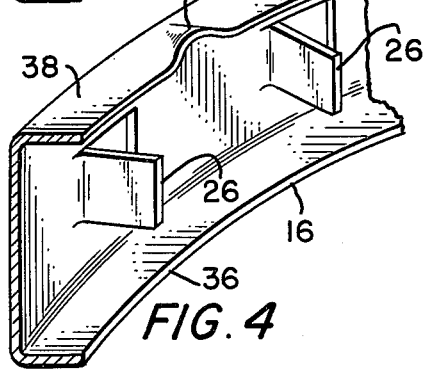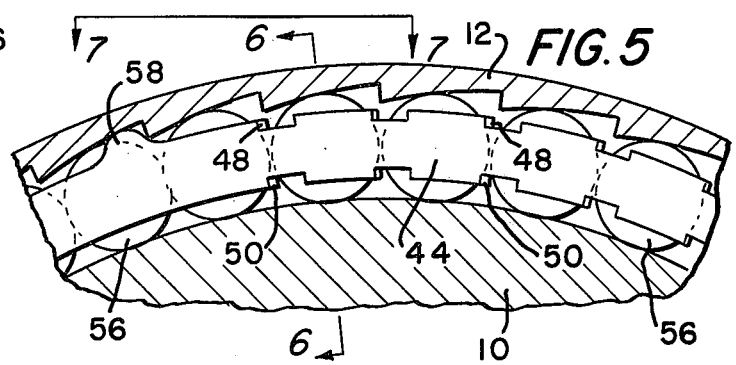

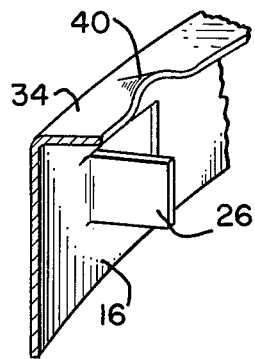
FIG. 10
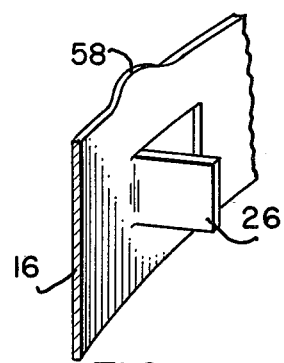
FIG. 11
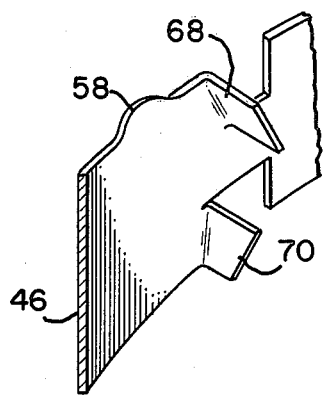
FIG. 14
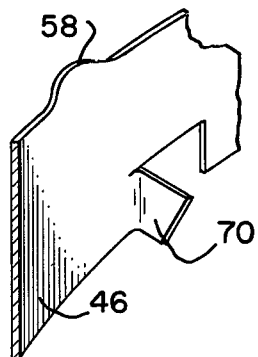
FIG. 15
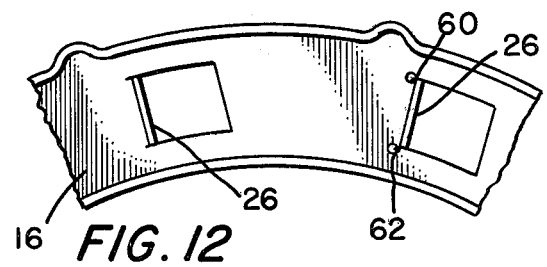
FIG. 12
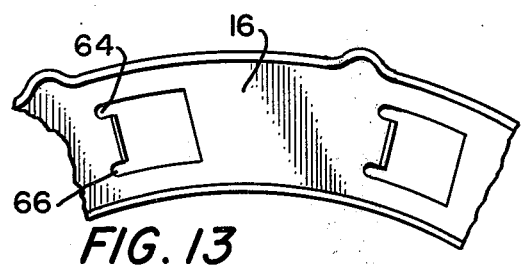
FIG. 13
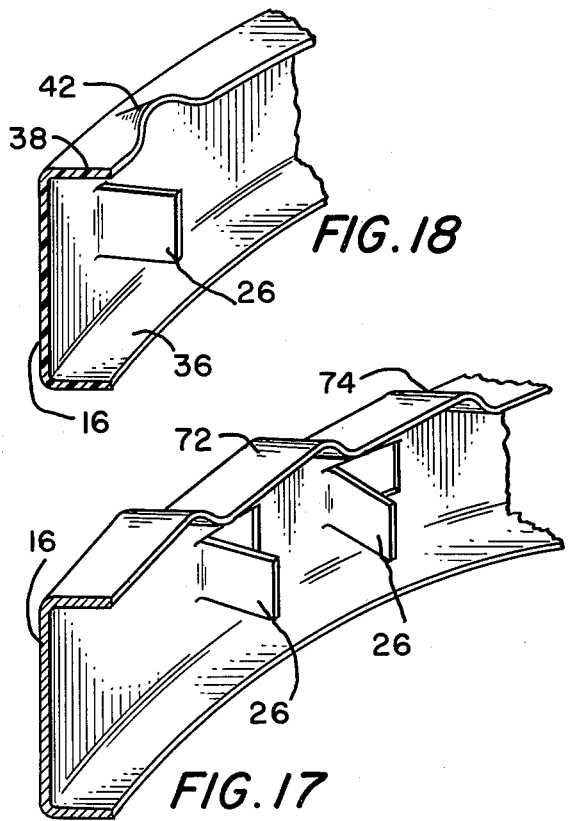
FIG. 18
FIG. 17
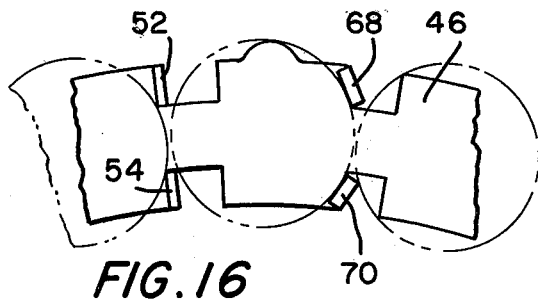
FIG. 16

OVERRUNNING CLUTCH AND RETAINER

This invention relates to overrunning clutches. More particularly, this invention is a new and novel two-piece retainer for use in overrunning roller clutches.

For an overrunning roller clutch of a particular size, it is desirable to have as many rollers as possible in the space between the shaft and the clutch outer case. In general, the more rollers that can be fit in a clutch of a particular size, the greater the torque capacity of the clutch. When clutch rollers are spaced far enough apart to have springs in the smallest circumferential space between rollers to bias the rollers toward lockup, it is wasteful of clutch space and thereby of clutch torque capacity. Retainers for such clutches are shown in U.S. Pat. Nos. 3,500,977 and 3,537,554.

Clutches are used in many different forms and for many different purposes. For some purposes a full complement clutch, that is a clutch without any biasing springs at all, is quite adequate. In other cases, a modified full complement clutch with only one or two biasing springs may be used satisfactorily. Such a clutch is shown in U.S. Pat. No. 3,737,015. However, under most circumstances these types of full complement clutches have inconsistent and non-uniform lockup, and also non-uniform roller loading and stressing since the rollers which lock up first carry more load than the rollers which lock up later.

I have invented a new and novel retainer construction which permits the manufacturer to use a full complement of rollers in an overrunning clutch and yet permits each roller to be individually biased. This will provide a clutch which has the maximum possible clutch torque capacity for the given space available, and will provide a clutch which has more consistent and uniform lockup and more uniform roller loading and stressing than that obtainable by the other known full complement overrunning clutches. More uniform loading will result in a lower maximum stress in the most heavily loaded roller and thereby will result in longer clutch life due to decreased rate of metal fatigue and failure of the clutch members.

One embodiment of my invention is to be used with rollers which have reduced end diameters, such reduced ends being called trunnions. A second embodiment is to be used with square end rollers or rollers which have only slightly radiused edges. The square end rollers in the same space as trunnion end rollers normally have greater load capacity due to the greater length of the full-diameter section of the square end rollers.

Briefly described, my invention of a clutch retainer comprises a first end plate and a second end plate positioned in a longitudinally spaced relationship between the inner and outer clutch members which may be the shaft or inner race and the outer case with the cammed clutch surfaces on its interior.

The invention as well as its many advantages will be further understood by references to the following detailed drawings and description in which;

FIG. 1 is a front view, partly in section, of an overrunning roller clutch showing one embodiment of the new retainer as used with trunnion-end rollers;

FIG. 2 is a view partly in section, of one roller and the retainer on the shaft with the outer clutch case removed, generally along the lines 2—2 of FIG. 1;

FIG. 3 is a view lookng radially inward at the rollers and retainer on the shaft with the outer clutch case removed, generally along the lines of 3—3 of FIG. 1;

FIG. 4 is an enlarged fragmentary view of one of the end plates of the retainer of FIGS. 1, 2 and 3;

FIG. 5 is a front view, partly in section, of an overrunning roller clutch showing a second embodiment of the new retainer as used with square end rollers;

FIG. 6 is a view partly in section of one roller and the retainer on the shaft with the outer clutch case removed, generally along the lines 6—6 of FIG. 5;

FIG. 7 is a view looking radially inward at the rollers and retainer on the shaft with the outer clutch case removed, generally along the lines of 7—7 of FIG. 5;

FIG. 8 is an enlarged fragmentary view of one of the end plates of the retainer of FIGS. 5, 6 and 7;

FIG. 9 is a modification of the end plate of FIG. 4 wherein there is no outer flange;

FIG. 10 is a modification of the end plate of FIG. 4 wherein there is no inner flange;

FIG. 11 is a modification of the end plate of FIG. 4 wherein both flanges have been eliminated;

FIG. 12 is an end view of a modified end plate similar to the embodiment of FIG. 4 looking toward the bent-in leaf-spring tabs which have been lanced from the end rim, showing tab crack-propagation-stop holes at one tab;

FIG. 13 is a modification of the end plate of FIG. 4 wherein material has been punched out and removed from the sides of the spring tab instead of the tab merely being lanced out of the metal with no removal of material;

FIG. 14 is a modification of the end plate of FIG. 8 wherein the spring tabs lie substantially tangent to the roller body;

FIG. 15 is a modification to the end plate of FIG. 14 wherein only a radially inner spring tab is used;

FIG. 16 is an end view of an end plate showing the leaf spring fingers of both FIG. 8 and FIG. 14 in use on the same end plate;

FIG. 17 is a modification to the end plate of FIG. 4 wherein the outer flange follows the contour of the clutch ramps and backstop of the clutch outer case;

FIG. 18 is the plastic counterpart to the end plate of FIG. 4;

Figure 19:
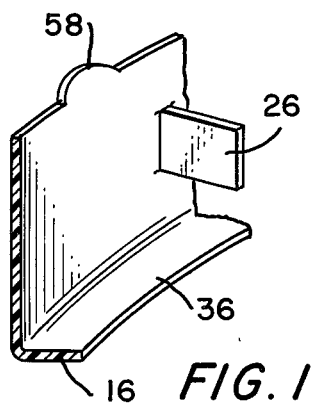
FIG. 19 is the plastic counterpart to the end plate of FIG. 9.
Figure 20:
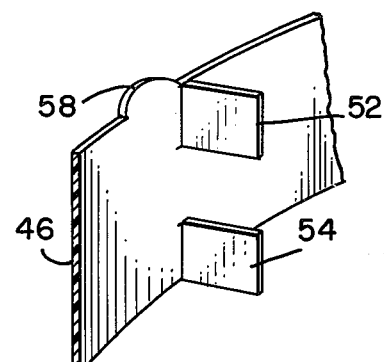
FIG. 20 is the plastic counterpart to the end plate of FIG. 8.
Figure 21:
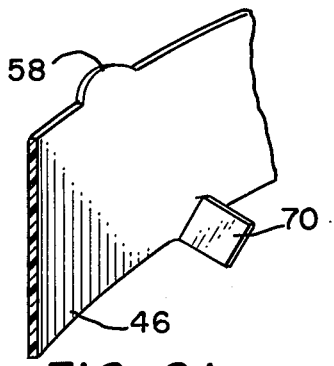
FIG. 21 is the plastic counterpart to the end plate of FIG. 15.

Referring to the drawings, and more particularly to FIGS. 1 through 3, my new retainer is shown positioned in the space between a shaft or inner race 10 and a clutch outer member 12. The inside diameter of the outer case 12 is greater than the outside diameter of the shaft 10.

My new retainer comprises a first end plate 14 and a second end plate 16 (see FIGS. 2 and 3). The end plates are longitudinally separated along the shaft 10 within the clutch case 12.

The inside perimeter of the outer case 12 has a plurality of clutch cam surfaces each including a ramp 18 and a backstop surface 20. A plurality of trunnion end rolling members 22, one for each ramp, is retained by the retainer end plates in the space between the shaft 10 and the outer case 12. Relative rotation of the shaft and the outer case in a direction such that the rollers are moved down the ramps toward the area of increasing space adjacent the stops 20 will cause the shaft and outer case to be in the unlocked or overrunning condition in which they can have rotation rotation. Relative rotation of the shaft and case in the opposite direction such that the rollers tend to move up the ramp toward the area of decreasing space between the shaft and the outer case causes lockup of the shaft and outer case through wedging of the rolling members between shaft and case and prevents any further rotation of the shaft with respect to the outer case.

Each retainer end plate includes a plurality of circumferentially spaced biasing members such as the biasing leaf spring tabs 24 and 26 lanced from the end plates 14 and 16 respectively. Leaf springs 24 on end plate 14 extend substantially axially toward the opposite end plate 16; leaf springs 26 on end plate 16 extend substantially axially toward end plate 14. Each leaf spring 24 is directly opposite a leaf spring 26. The free ends of an opposed mating pair of leaf springs engage trunnion ends of a roller and urge at least one of the rollers toward lockup position on the clutch ramp. The free ends of the leaf springs do not extend into the smallest spacing between adjacent rollers. This arrangement permits a maximum number of rollers for a given size clutch.

The stop lugs 40 and 42 on the end plates 14 and 16 respectively are positioned to engage the backstop surface 20 of the outer case to properly circumferentially position the spring tabs and to prevent relative rotation of the retainer with respect to the outer case.

It is possible to make an overrunning clutch with my new retainer utilizing less than a full complement of mating pair of springs to urge the rolling members toward the lockup position, with some rollers pushing other rollers as shown at the left end of FIGS. 1 and 5 and the left-hand half of FIGS. 3 and 7. However, one prime advantage of my new overrunning clutch is that each individual roller, separated from each roller next to it by only an extremely slight space to accommodate manufacturing inaccuracies and tolerances in the clutch and in the mechanism in which it is used, is individually and continuously biased toward the wedging lockup position as shown in the right-hand half of FIGS. 1 and 5 and the right-hand half of FIGS. 3 and 7. When relative motion of shaft and case is in the lockup direction, with individual biasing, the lockup is immediate and relatively uniform on all rollers, and loading and stressing of clutch components are also uniform. The spacing between rollers is too slight to permit biasing springs between the rollers at their major diameters; instead, the springs operate against trunnions, or against the inside walls, or against the outside surfaces but away from the planes connecting the centers of rollers. Thus, this invention provides the art with a new full complement overrunning clutch with the maximum number of rollers for any particular size, which clutch does not suffer from the uneven stress and wear which is often found in currently known full complement overrunning clutches which have non-uniform roller lockup and non-uniform roller loading and stressing.

The retainer embodiments shown in FIGS. 1 through 17 are made of spring metal. FIGS. 18 through 21 show only four plastic counterparts to the metal retainers; however, each spring metal retainer embodiment has a molded resilient plastic counterpart.

The retainer embodiments shown in FIGS. 1 through 4, FIGS. 9 through 13, and FIGS. 17 through 19 are to be used with trunnion end rollers. Retainer embodiments of FIGS. 5 through 8, FIGS. 14 through 16, and FIGS. 20 through 24 are to be used with square end rollers.

The retainer end plate of FIGS. 1 through 4, to be used with trunnion end rollers is made of spring metal. As best shown in FIG. 2 and in FIG. 4, an inner flange 32 and an outer flange 34 extend at approximately right angles from the radially inner edge and the radially outer edge of the end plate 14. Similar inner and outer flanges 36 and 38 are provided on the opposite end plate 16.

The inner flanges 32 and 36 support the trunnion end rollers 22 and retain them in the clutch assembly before the shaft or inner race is installed. Leaf spring tabs 24 and 26 extend axially between the flanges and bear against the roller trunnions. Backstop lugs 40 and 42 are formed on the outer flanges 34 and 38 to fit in the cam space of the outer case to circumferentially locate the leaf spring tabs and to prevent relative circumferential motion between retainer and outer case by butting against the backstop surface 20. The clutch and shaft components are so sized that when the shaft is inserted into the assembly of outer case, rollers, and retainer, the rollers are moved down the clutch ramps toward the increasing cam spaces, and the trunnions push back the leaf spring tabs. Thereafter, the leaf springs resiliently and constantly bias the rollers toward the wedging lockup position by bearing against the roller trunnions.

Figure 22:
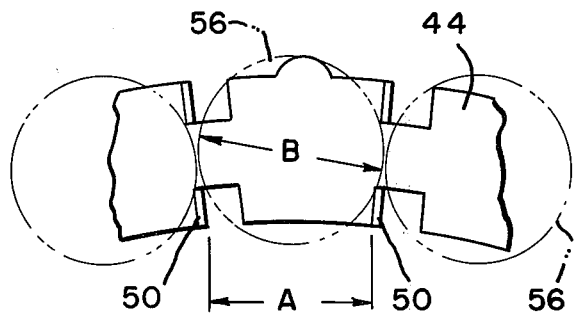
FIG. 22 is an end view of the end plate of FIG. 8 showing how the inner tabs prevent the roller from falling radially inward before the shaft is installed in the clutch assembly.

The retainer end plate of FIGS. 5 through 8, to be used with square end rollers, is also made of spring metal. As best shown in FIG. 6 and FIG. 8, the spring biasing members include a plurality of sets of leaf springs such as the outer leaf spring 48 extending substantially axially in a substantially radial plane from the outer rim of end plate 44 and inner leaf spring 50 extending substantially axially in a substantially radial plane from the inner rim of end plate 44. A matching plurality of sets of springs 52 and 54 are provided on the opposite end plate 46. A stop lug 58 fits in the cam space of the outer case to circumferentially locate the leaf spring tabs and to prevent relative circumferential motion between the end plate and the outer case by butting against the backstop surface 20. The outer tabs 48 and 52 are sufficiently outside of the plane connecting the centers of the rollers 56; and the inner tabs 50 and 54 are sufficiently inside of this plane that the springs do not interfere with the roller behind them even though the rollers are only very slightly separated. The springs push against the periphery of the rollers. Because only the thickness of metal in the end plates 44 and 46 takes axial clutch space away from the square end rollers 56, there is greater usable clutching length when using this retainer than there is when using the retainer of FIG. 4 with trunnion end rollers. As best shown in FIG. 22, the space A between two adjacent inner spring tabs 50 is less than diameter B of the roller 56, and thus the spring tabs retain the roller in the clutch case before the shaft is installed. Insertion of the shaft in the assembly of clutch case, rollers and retainer, causes the rollers to move down the clutch ramps and to flex the springs which thereafter resiliently and constantly bias the rollers toward the lockup position.

FIGS. 9 through 11 show modifications to the retainer wherein the retainer end plate is formed either with only an inner flange 36 or an outer flange 38 or no flange at all.

FIG. 12 shows the end plate of FIG. 4 with the additional feature of two small holes 60 and 62 pierced in the end plate at the proper location to stop the propagation of cracks in the metal which may come from the lancing and forming of the leaf spring tabs.

FIG. 13 shows an end plate from which material has been completely punched away from either two or three edges of the leaf spring to make the manufacture easier or better, or both.

FIG. 14 shows a modification to the leaf spring tabs of FIG. 8 in that these tabs 68 and 70 are bent at such an angle that the roller contacts the faces of the tabs rather than contacting axial edges as with tabs 52 and 54 of FIG. 8. This gives a better spring action in the tab and reduces any possibility of damage to the roller from the tab edges.

FIG. 15 shows the end plate of FIG. 14 modified to utilize only the inner spring 70. In some clutches, this is sufficient. It is equally possible to modify the end plate of FIG. 8 to use only the inner spring 54.

FIG. 16 is an end view of an end plate 46 as it would look with one set of spring tabs 52 and 54 of FIG. 8 and one set of spring tabs 68 and 70 of FIG. 14. Normally, the two spring designs would not be used on the same end plate.

The end plate of FIG. 17 is a modification of the end plate of FIG. 4 wherein the outer flange 72 is shaped to follow the contour of the cam surface of the outer case 12. Outer surface 74 serves the same function as backstop lug 42; namely, to locate the spring circumferentially and to prevent relative rotation of retainer end plate and clutch case.

FIGS. 18 through 21 serve to illustrate the fact that any of the spring metal end plates may have a molded resilient plastic counterpart with comparable flanges and springs and stop lugs. The parts in FIG. 18, FIG. 19, FIG. 20 and FIG. 21 are identified by the numbers identifying corresponding parts in FIG. 4, FIG. 9, FIG. 8 and FIG. 15, respectively.

Figure 23:
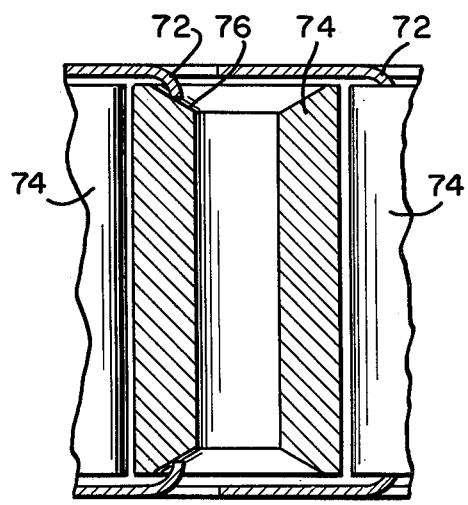
FIG. 23 is a sectional view, on an enlarged scale, showing the use of hollow rollers with my new invention.

Referring to FIG. 23, each biasing spring 72 extends into a hollow roller 74. Each spring engages a tapering side 76 of the inner wall of the hollow roller and urges the hollow roller toward lockup position on the clutch ramps. Alternatively, the spring may extend into the cylindrical bore and engage the interior cylindrical wall. Also, the end counterbore wall may be cylindrical with the spring in contact with the counterbore wall. In a modification of this design, the retainer may consist of a single end plate with each biasing spring extending into the hollow bore and engaging the interior wall.

Figure 24:
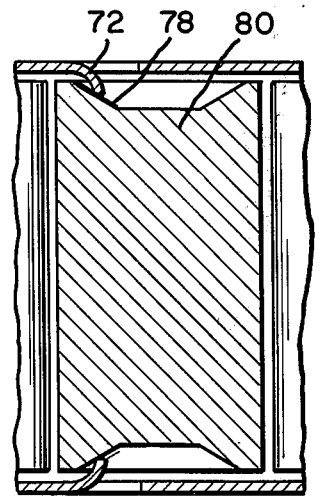
FIG. 24 is a sectional view similar to FIG. 23 showing hollow ended rollers with my new invention.

In the embodiment shown in FIG. 24, each spring 72 engages a tapering side surface 78 of a hollow ended roller 80 to urge the hollow ended roller toward lockup position on the clutch ramp. Alternatively, side surface 78 may be cylindrical instead of tapered.

A unique feature of this invention in that when the shaft is installed in the clutch assembly of outer case rollers, and retainer, the rollers may push the leaf spring tabs far enough that the stress level in the springs exceeds the yield point and the springs will be permanently but slightly deformed; yet, they will still resiliently bias the rollers toward lockup position as the stress level drops below the yield point of the material.

While the spring tabs have been illustrated as axially extending plane figures, they may equally well be curved to suit particular needs, and often will be so curved.

I claim:

1. In a clutch with an inner member and an outer member of greater inside diameter than the outside diameter of the inner member thereby providing a space between said inner and outer members with one of said members having a cam surface and a plurality of adjacent rolling members in said space; the smallest circumferential space between the rollers being too small to allow springs to enter such smallest space and operate properly; a retainer comprising;

a first end plate and a second end plate, said end plates being positoned in the space between the inner and outer clutch members;

each end plate including a plurality of circumferentially spaced spring biasing members extending axially toward the other end plate, each spring biasing member extending into a circumferential space between adjacent rolling members larger than the smallest circumferential space between said adjacent rolling members; and means for preventing relative rotation of the end plates with respect to the member having a cam surface.

2. The retainer of claim 1 wherein:
each of the end plates and their spring biasing members are made of spring metal.

3. The retainer of claim 1 wherein:
each of the end plates and their spring biasing members are made of molded plastic.

4. The retainer of claim 2 wherein:
an inner flange and an outer flange extend at approximately right angles from the inner edge and the outer edge, respectively, of each of the end plates.

5. The retainer of claim 2 wherein the spring biasing members comprise a plurality of leaf spring tabs extending axially from the radial mid-portion of the end plates.

6. The retainer of claim 2 wherein:
the spring biasing means includes a plurality of sets consisting of a upper leaf spring tab extending from the outer edge of each end plate and a lower leaf spring tab extending from the inner edge of each end plate.

7. The retainer of claim 6 wherein:
the leaf spring tabs extend angularly with respect to the radius of the clutch.

8. The retainer of claim 3 wherein:
the spring biasing members comprise a plurality of sets of plastic tabs, each consisting of an upper tab extending axially from the upper edge of each end plate and a lower plastic tab extending axially from the lower edge of each end plate.

9. The retainer of claim 3 wherein:
the spring biasing members are a plurality of plastic tabs axially extending from the radial mid-portion of each end plate.

10. The retainer of claim 9 wherein:
an integral plastic flange is provided at the lower edge of each end plate.

11. The retainer of claim 10 wherein:
an integral plastic flange is also provided at the upper edge of each end plate.

12. The retainer of claim 1 wherein:
the rolling members are trunnion rollers; and the spring biasing members extend into circumferential spaces between the trunnions.

13. The retainer of claim 1 wherein:
the rolling members are substantially square ended rollers.

14. An overrunning roller clutch comprising;
a cylindrical inner member and an outer member of greater inside diameter than the outside diameter of the inner member thereby providing a space between said inner and outer members with said outer member having clutch cam surfaces on its interior periphery;
a plurality of rolling members in said space, the smallest circumferential space between the rolling members being too small to allow biasing springs to enter such smallest space and operate properly,
a retainer consisting of a first end plate and a second end plate said end plates being longitudinally spaced apart at opposite ends of the rolling members and being positioned in the space between the inner and outer clutch members;
each end plate including a plurality of circumferentially spaced biasing tab members extending axially toward the other end plate, each biasing member extending into a circumferential space between adjacent rolling members larger than the smallest circumferential space between said adjacent rolling members and resiliently urging at least one of the plurality of rollers toward lockup wedging position in the clutch; and
means for preventing relative rotation of the end plates with respect to the member having a cam surface.

15. The clutch of claim 14 wherein: each of the end plates and their biasing members are made of spring metal.

16. The clutch of claim 15 wherein an inner flange extends approximately axially from the inner edge of the end plate.

17. The clutch of claim 15 wherein: an outer flange extends approximately axially from the outer edge of the end plate.

18. The clutch of claim 15 wherein: there are an inner flange and an outer flange extending approximately axially from the inner and outer edges respectively of the end rim.

19. The clutch of claim 15 wherein: the biasing members comprise a plurality of leaf spring tabs extending axially from the approximate radial mid-portion of the end plates.

20. The clutch of claim 15 wherein: the biasing members include a plurality of sets each consisting of an outer leaf spring tab extending axially from the outer area of each end plate in a generally radial plane and an inner leaf spring tab extending axially from the inner area of each end plate in a generally radial plane.

21. The clutch of claim 20 wherein: the leaf spring tabs extend angularly with respect to the radius of the clutch so that the face of each tab at its free end is tangent to the outside perimeter of the roller contacted by the spring.

22. The clutch of claim 14 wherein: the end plates and their associated leaf spring tabs are of molded resilient plastic.

* * * * *